US010133525B2

(12) United States Patent
Nathani et al.

(10) Patent No.: US 10,133,525 B2
(45) Date of Patent: Nov. 20, 2018

(54) AUTONOMOUS SECURE PRINTING

(71) Applicant: Citrix Systems, Inc., Fort Lauderdale, FL (US)

(72) Inventors: Venu Gopal Nathani, Parkland, FL (US); Mukund Ingale, Pompano Beach, FL (US); Ian Russell Wesley, Parkland, FL (US); Lin Cao, Boca Raton, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 44 days.

(21) Appl. No.: 14/819,626

(22) Filed: Aug. 6, 2015

(65) Prior Publication Data
US 2017/0039007 A1 Feb. 9, 2017

(51) Int. Cl.
*G06K 15/00* (2006.01)
*G06F 3/12* (2006.01)
*G06F 21/60* (2013.01)
(52) U.S. Cl.
CPC .......... *G06F 3/1222* (2013.01); *G06F 3/1238* (2013.01); *G06F 3/1267* (2013.01); *G06F 3/1292* (2013.01); *G06F 21/60* (2013.01)
(58) Field of Classification Search
CPC ....................... H04N 1/00864; H04N 1/00867
See application file for complete search history.

(56) References Cited

U.S. PATENT DOCUMENTS

| 2002/0054330 | A1 | 5/2002 | Jinbo et al. |
| 2005/0128968 | A1 | 6/2005 | Yang |
| 2006/0044598 | A1 | 3/2006 | Etelapera |
| 2011/0016404 | A1 | 1/2011 | Sano et al. |
| 2013/0321864 | A1* | 12/2013 | Jintsugawa ........... G06F 3/1236 358/1.15 |
| 2014/0085663 | A1* | 3/2014 | Kavanappillil .... H04N 1/00342 358/1.15 |

(Continued)

FOREIGN PATENT DOCUMENTS

| CN | 1657299 A | 8/2005 |
| CN | 102547031 A | 7/2012 |
| EP | 1840728 A2 | 10/2007 |

OTHER PUBLICATIONS

"IBeacon for Developers", Apple Developers, retrieved Apr. 21, 2015 <https://developer.apple/ibeacon/>.

(Continued)

*Primary Examiner* — King Poon
*Assistant Examiner* — Michael Burleson
(74) *Attorney, Agent, or Firm* — Banner & Witcoff, Ltd.

(57) ABSTRACT

Methods and systems for virtual printing are described herein. A user may print to a virtual printer via a user device, and the user device may send print creation data to a server. The server may generate a print job based on the print creation data and store the print job in a print queue associated with the user. When the user approaches the location of one or more physical printers, a device handled by the user may detect a location sensor at the location and send a corresponding identifier to the server. The server may identify the one or more physical printers based on the identifier and send the print job stored in the print queue to one of the physical printers.

20 Claims, 17 Drawing Sheets

(56) References Cited

U.S. PATENT DOCUMENTS

2015/0070725 A1 3/2015 Monden
2016/0004485 A1 1/2016 Sasase

OTHER PUBLICATIONS

"Knowledge Center Communities Forums Blogs: Universal Print Server", Citrix, Oct. 27, 2014.
"LightBlue Bean", Punch Through Design, 2014.
"Octoblu", Octoblu, retrieved Apr. 21, 2015 <http://www.octoblu.com/>.
"QR Code Generator", QR Stuff, retrieved Apr. 21, 2015 <http://qrstuff.com/>.
"Region Monitoring and iBeacon", Apple Developer, retrieved on Apr. 22, 2015 <https://developer.apple.com/library/ios/documentation/UserExperience/Conceptual/LocationAwarenessPG/RegionMonitoring/RegionMonitoring.html>.
"Team: Octoblu", Citrix Blogs, retrieved Apr. 21, 2015 <http://blog.citrix.com/team/octoblu>.
"What is NFC", NFC Forum, retrieved Apr. 21, 2015 <http://nfc-forum.org/what-is-nfc/>.
"Find Me Printing", Papercut Software International, retrieved Jul. 17, 2015 from <http://www.papercut.com/tour/find/-me-printing/>.
"How it Works", Oki Data Americas, Inc., retrieved Jul. 17, 2015 from <http://www.okidata.com/followme-how-it-works>.
"Equitrac Follow-You Printing", Equitrac Corporation, EQ-222-0211, 2010.
"Secure Document Output Management Solution Ringdale FollowMe", Xerox Corporation, retrieved Jul. 17, 2015 from <http://www.xerox.co.uk/office/software-solutions/ringdale-followme/engb.html>.
"Pull Printing", Wikipedia, retrieved Jul. 17, 2015 from <http://en.wikipedia.org/wiki/Pull-printing>.
Oct. 13, 2016—International Search Report and Written Opinion—App No. PCT/US2016/019312.
Sep. 3, 2018—(CN) Office Action—App 201680028122.9.

\* cited by examiner

AUTONOMOUS SECURE PRINTING

FIELD

Aspects described herein generally relate to computer networking, remote access, and location detection. More specifically, aspects described herein relate to initiating printing from a virtual printer based on the location of a user device determined from a location sensor.

BACKGROUND

To implement secure follow-me printing, a proprietary card scanner and numeric keypad may be attached to a printer. A user may scan a corresponding card and enter a secure PIN in order to print a document. In other words, the printer may require additional hardware, such as the card scanner and numeric keypad, and potentially require special firmware to support PIN authentication. One drawback of these follow-me printing implementations is that printers manufactured by different vendors or printers not having a card scanner or PIN validation mechanism might not be usable for follow-me printing.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards systems, apparatuses, computer-readable media, memory, and methods for a client device wirelessly receiving, from a location sensor, an identifier for the location sensor in response to detecting the location sensor. A device corresponding to the identifier for the location sensor may be determined, and resources of the device may be made available to the client device. After making the resources of the device available to the client device, the client device may send data for accessing the resources of the device. The device may comprise a printer, and the resources of the device may comprise printing services. The data for accessing the resources of the device may comprise print job data.

In some aspects, the client device may include a display, and the client device may display, on the display, a listing of devices available to the client device, the listing of devices comprising the device. In these examples, sending the data for accessing the one or more resources of the device may be performed in response to receiving a user selection of the device from the listing of devices available to the client device.

The method may further comprise the client device requesting the identifier from the location sensor in response to detecting the location sensor and prior to wirelessly receiving the identifier. In some aspects, the distance between the client device and the location sensor may be determined. Making the one or more resources of the device available to the client device may also be performed in response to determining that the distance between the client device and the location sensor is less than a threshold.

The location sensor may comprise a first location sensor, and the device may comprise a first device. In these examples, the method may further comprise determining a distance between the client device and the first location sensor. In response to determining that the distance between the client device and the first location sensor is less than a distance between the client device and a second location sensor corresponding to a second device, the first device may be set as a default device for the client device.

In some aspects, making the one or more resources of the device available to the client device may comprise mapping the device to the client device in a virtual session between the client device and a server. The device may comprise a printer, and making the one or more resources of the device available to the client device may comprise installing a driver for the printer and mapping the printer to the client device.

In some aspects, the method may comprise the client device sending the identifier for the location sensor to a server. Making the one or more resources of the device available to the client device may be performed in response to the server receiving the identifier for the location sensor.

After the one or more resources of the device is made available to the client device, the method may comprise determining that a distance between the client device and the location sensor is greater than a threshold. The one or more resources of the device may be made unavailable to the client device in response to determining that the distance between the client device and the location sensor is greater than the threshold.

Aspects described herein are directed towards systems, apparatuses, computer-readable media, memory, and methods comprising receiving, at a server, print creation data from a first device associated with a user. Responsive to receiving the print creation data, a print job may be generated and stored in a virtual print queue corresponding to the user. Moreover, responsive to receiving an identifier from the first device or a second device associated with the user, the server may determine a printer corresponding to the received identifier. The first device may be configured to determine the identifier from a location sensor when the first device is within range of the location sensor and/or the second device may be configured to determine the identifier from the location sensor when the second device is within range of the location sensor. In some aspects, the location sensor may comprise an optically-scannable code. Additionally or alternatively, the location sensor may comprise a short-range wireless sensor. The print job stored in the virtual print queue may be sent to the printer.

The method may comprise generating a request for permission to send the print job to the printer, and the request may be displayable on the first device or the second device. Permission to send the print job to the printer may be received from the first device or the second device. Sending the print job may be performed responsive to receiving the permission to send the print job to the printer.

The printer may comprise a plurality of printers at a same location, and the method may comprise generating a request for a selection of one of the plurality of printers. The request may be displayable on the first device or the second device. A selection of one of the plurality of printers may be received from the first device or the second device. Sending the print job may be performed responsive to receiving the selection of the one of the plurality of printers.

The method may comprise generating a request to authenticate the user. Such a request may be displayable on the first device or the second device. The user may be authenticated based on user credentials received from the first device or the second device. Sending the print job may be performed responsive to authenticating the user based on the user credentials.

The second device may comprise a mobile device associated with the user, and the method may comprise receiving the identifier from the mobile device. In some aspects, determining the printer corresponding to the received identifier may be performed responsive to receiving the identifier from the mobile device.

Aspects described herein are directed towards systems, apparatuses, computer-readable media, memory, and methods comprising receiving, at a first user device, a request to print an item to a virtual printer. Responsive to receiving the request, the first user device may send print creation data for the item to a server. The server may be configured to generate a print job for the item to be printed and store the print job in a print queue corresponding to a user of the first user device. The first user device or a second user device may detect a location sensor. The location sensor may comprise an optically-scannable code and/or a short-range wireless sensor. Responsive to detecting the location sensor, the first user device or the second user device may determine an identifier from the location sensor. The first user device or the second user device may send the identifier to the server, and the server may be configured to send the print job to a printer corresponding to the identifier.

The method may comprise generating for display on a display of the first user device or the second user device a request for permission to send the print job to the printer. Permission to send the print job to the printer may be sent to the server. The server may be configured to send the print job to the printer responsive to sending the permission to the server.

In some aspects, the printer may comprise a plurality of printers at a same location, and the method may comprise generating for display on a display of the first user device or the second user device a request for a selection of one of the plurality of printers. The selection of one of the plurality of printers may be sent to the server. The server may be configured to send the print job to the printer responsive to sending the selection.

The method may comprise generating for display on a display of the first user device or the second user device a request to authenticate the user. User credentials may be sent to the server, and the server may be configured to send the print job to the printer responsive to authenticating the user based on the user credentials.

In some aspects, the second user device may comprise a mobile device, detecting the location sensor may be performed by the mobile device, determining the identifier from the location sensor may be performed by the mobile device, and sending the identifier to the server may be performed by the mobile device. The method may comprise determining a distance between the mobile device and the location sensor. Determining the identifier may be performed responsive to determining that the distance between the mobile device and the location sensor is less than a threshold.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards methods and systems for a client device wirelessly receiving, from a location sensor, an identifier for the location sensor in response to detecting the location sensor. A device corresponding to the identifier for the location sensor may be determined, and resources of the device may be made available to the client device. After making the resources of the device available to the client device, the client device may send data for accessing the resources of the device. The device may comprise a printer, and the resources of the device may comprise printing services. The data for accessing the resources of the device may comprise print job data.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
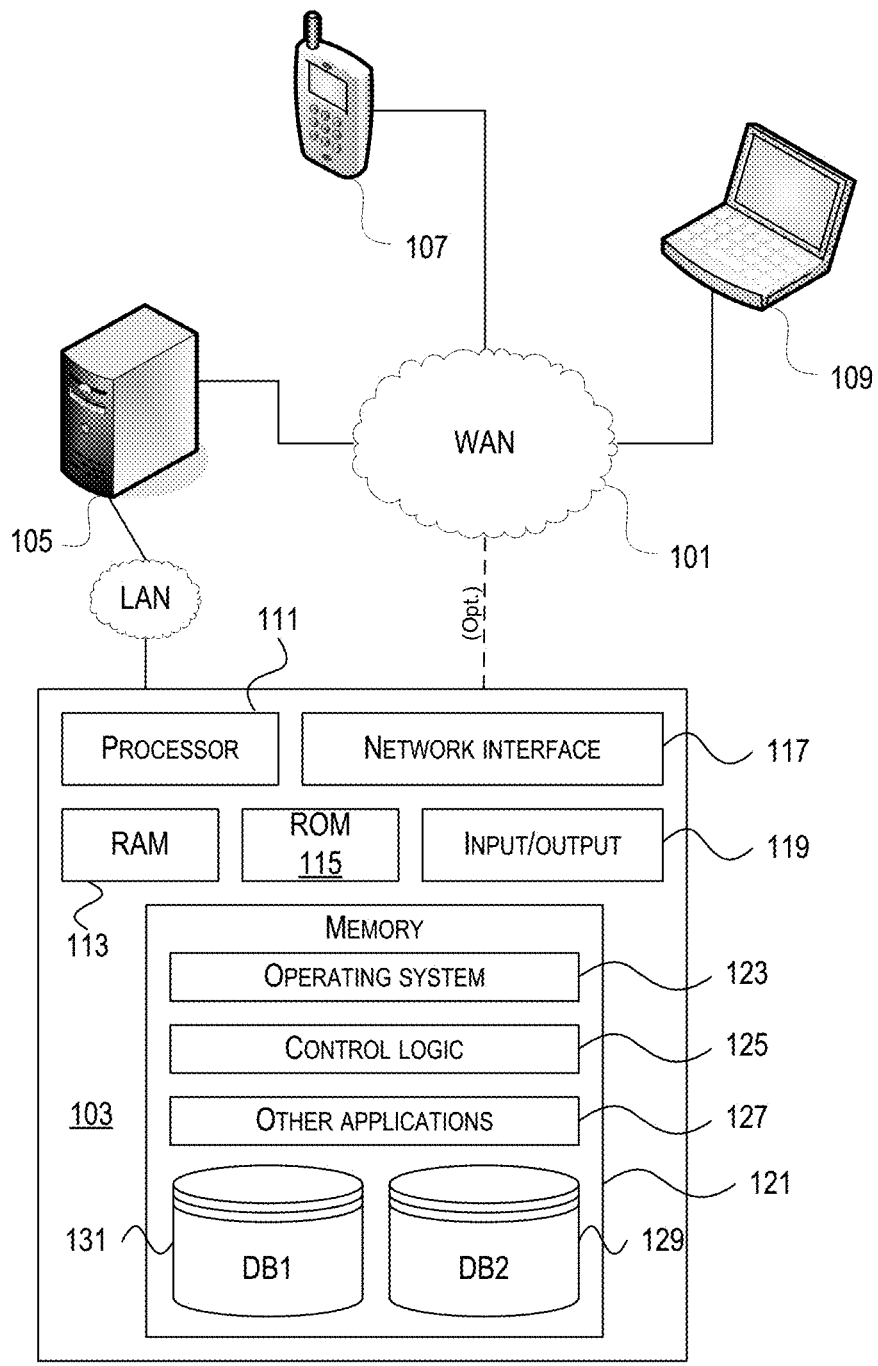
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein.

Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
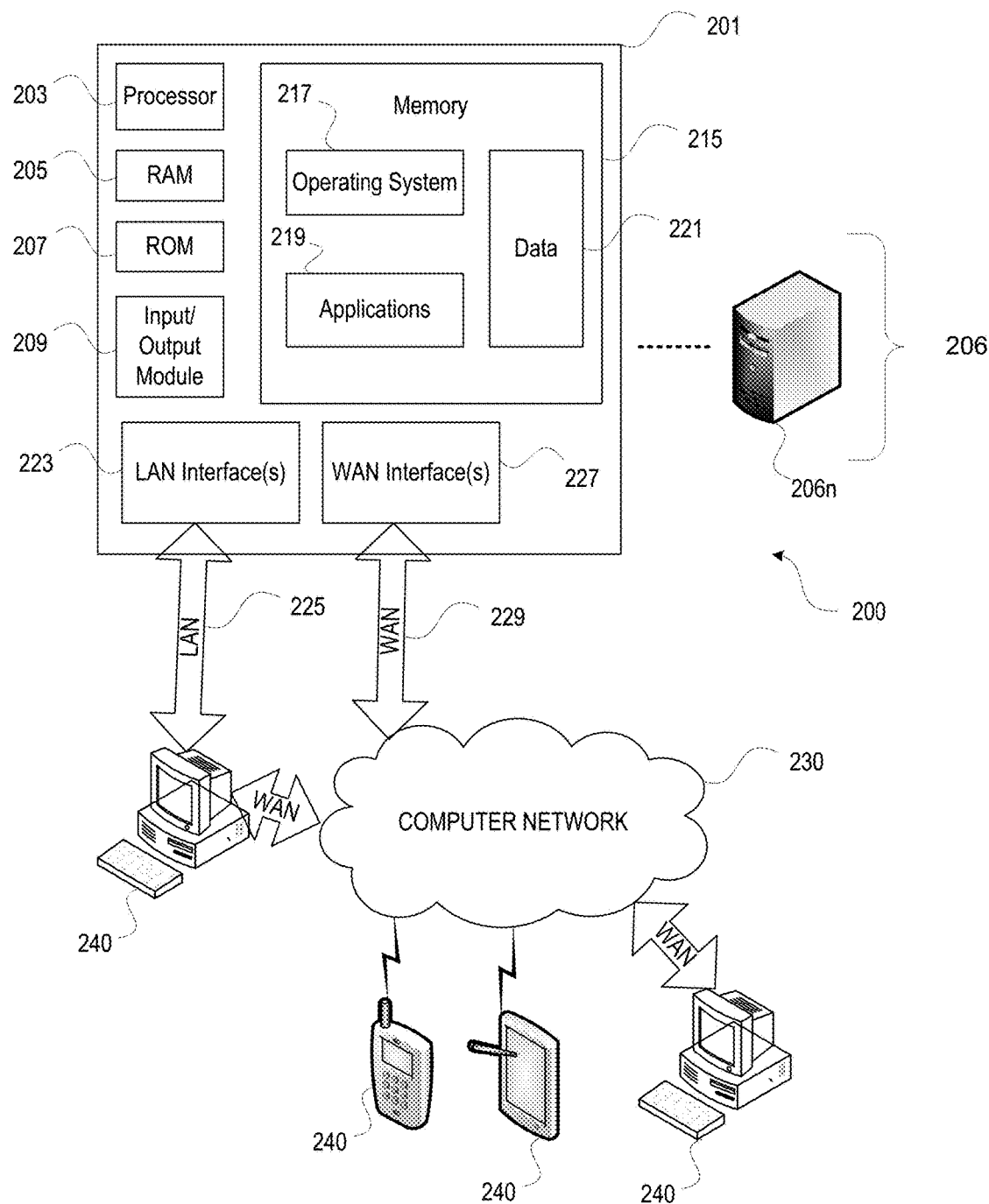
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 and well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 3:
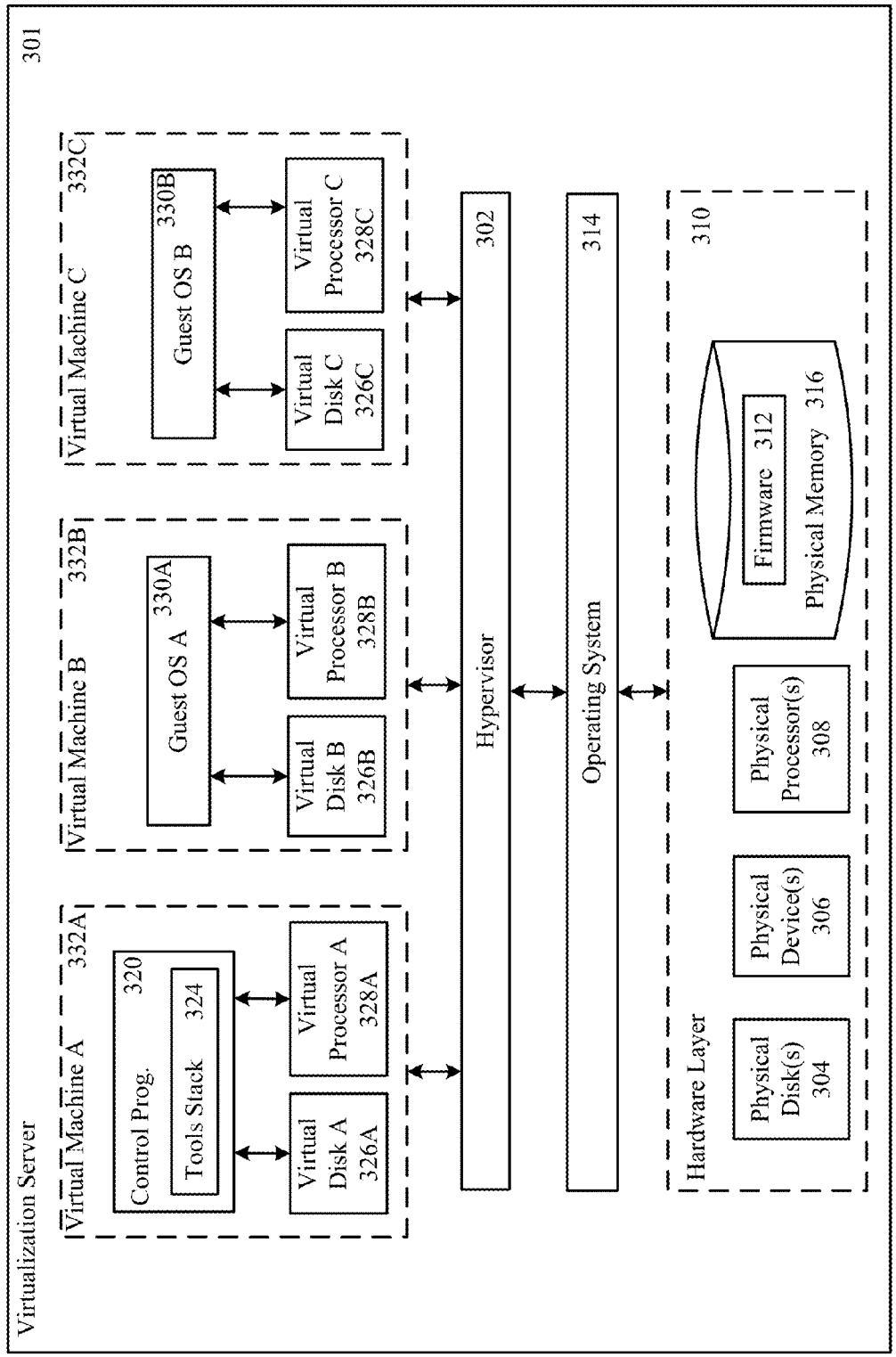
FIG. 3 depicts an illustrative virtualized (hypervisor) system architecture that may be used in accordance with one or more illustrative aspects described herein.

With further reference to FIG. 3, a computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 201 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 328 provides a modified view of physical processors 308 such that at least some of the characteristics of the virtual processor 328 are different than the characteristics of the corresponding physical processor 308.

Figure 4:
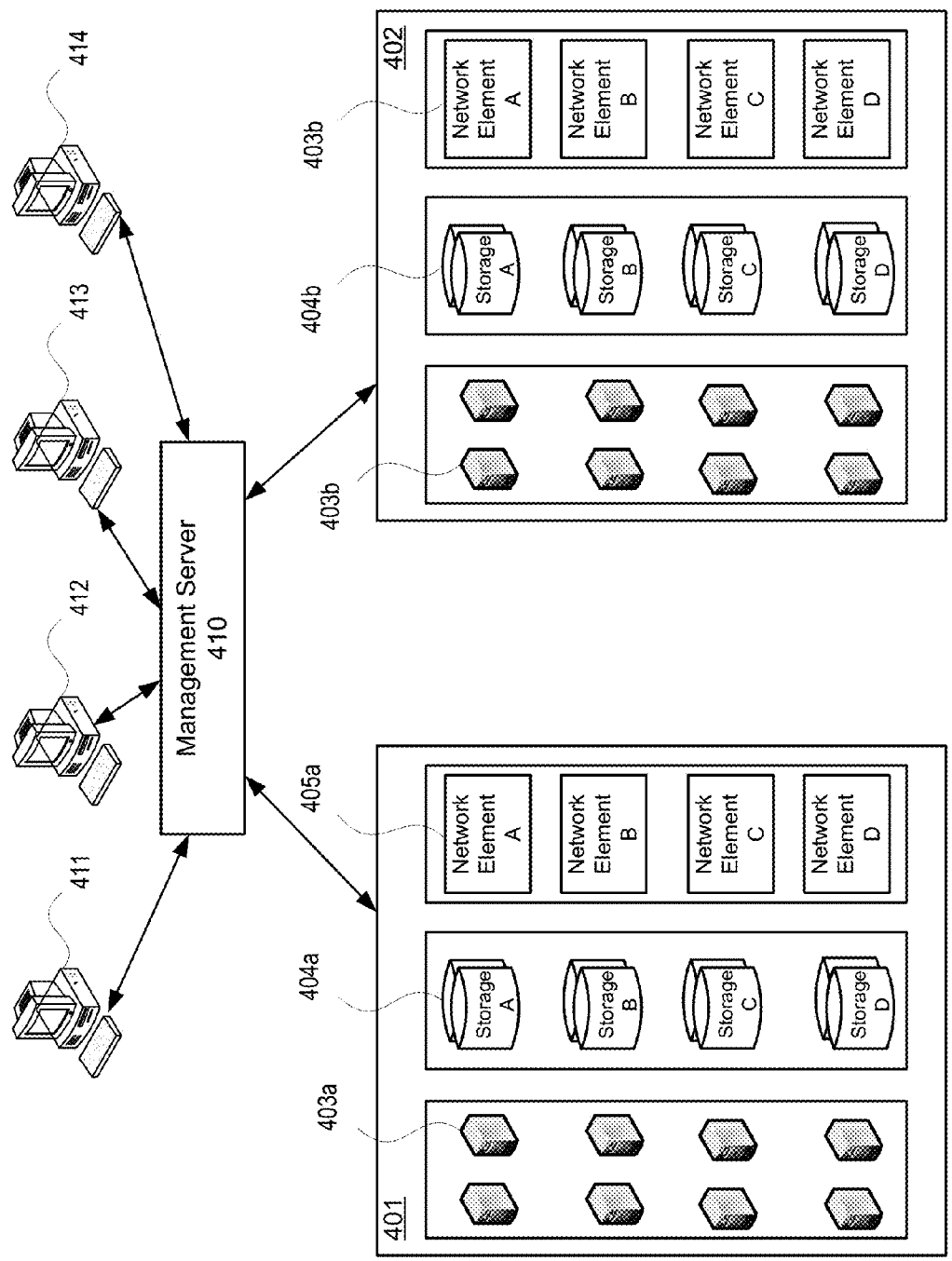
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of application programming interfaces (APIs) and/or one or more cloud operator console applications (e.g., web-based on standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
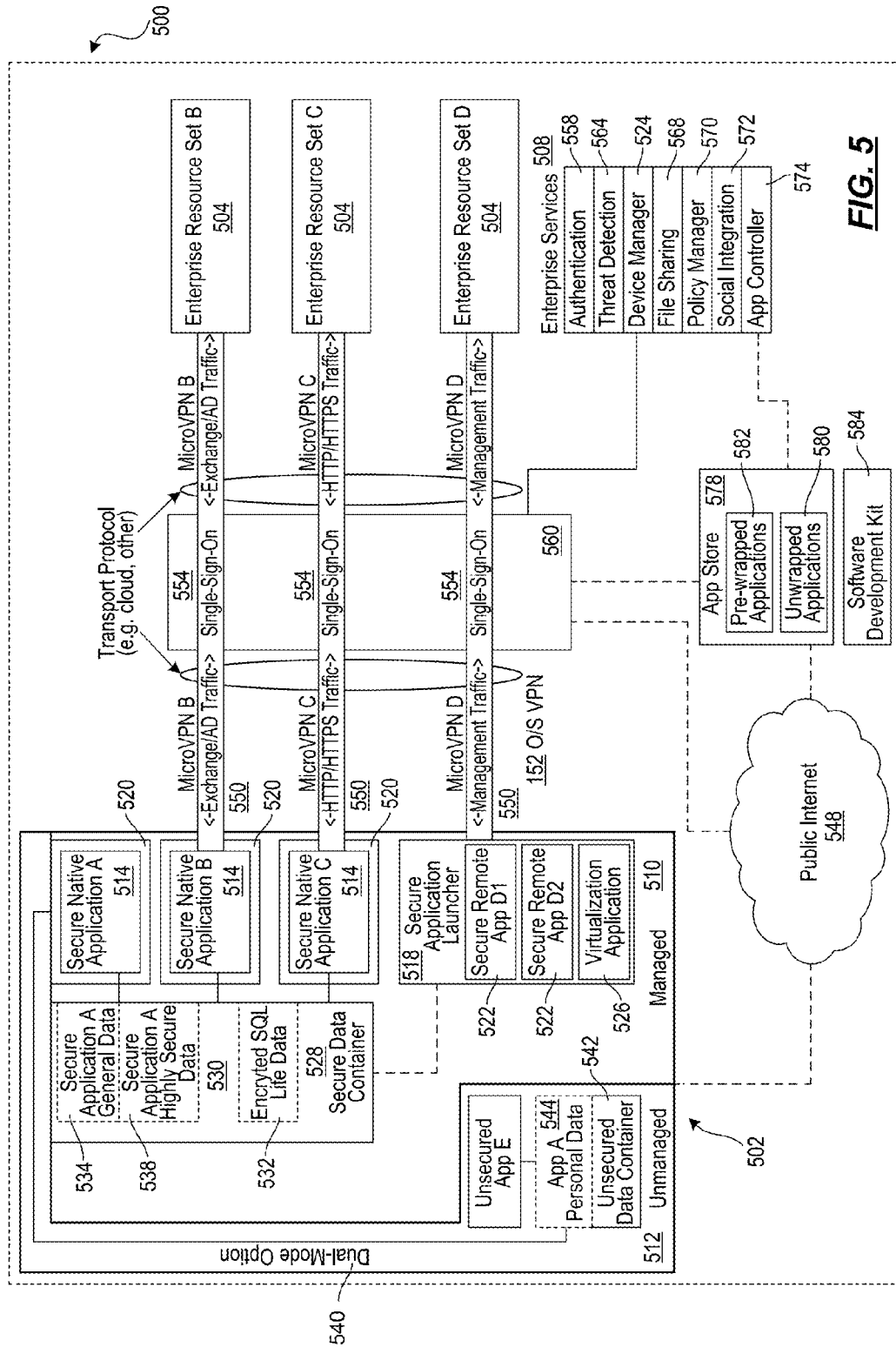
FIG. 5 depicts an illustrative enterprise mobility management system.

FIG. 5 represents an enterprise mobility technical architecture 500 for use in a BYOD environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to user. The user may utilize the mobile device 502 for business use only or for business and personal use. The mobile device may run an iOS operating system, and Android operating system, or the like. The enterprise may choose to implement policies to manage the mobile device 504. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 504 that is managed through the application of mobile device management policies may be referred to as an enrolled device.

In some embodiments, the operating system of the mobile device may be separated into a managed partition 510 and an unmanaged partition 512. The managed partition 510 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application is executed on the device. The secure application wrapper 520 may include meta-data that points the secure native application 514 running on the mobile device 502 to the resources hosted at the enterprise that the secure native application 514 may require to complete the task requested upon execution of the secure native application 514. The secure remote applications 522 executed by a secure application launcher 518 may be executed within the secure application launcher application 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a graphical user interface (GUI) and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUIs and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The secure applications may access data stored in a secure data container 528 in the managed partition 510 of the mobile device. The data secured in the secure data container may be accessed by the secure wrapped applications 514, applications executed by a secure application launcher 522, virtualization applications 526 executed by a secure application launcher 522, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the device upon receipt of a command from the device manager 524. The secure applications may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 548 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 504 and enterprise services 508 at an enterprise, to the public Internet 548, and the like. The mobile device may connect to enterprise resources 504 and enterprise services 508 through virtual private network connections. The virtual private network connections, also referred to as microVPN or application-specific VPN, may be specific to particular applications 550, particular devices, particular secured areas on the mobile device, and the like 552. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway may also re-route traffic from the mobile device 502 to the public Internet 548, enabling the mobile device 502 to access publicly available and unsecured applications that run on the public Internet 548. The mobile device may connect to the access gateway via a transport network 562. The transport network 562 may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud based resources, and the like. The enterprise resources 504 may be accessed by the mobile device 502 directly or through the access gateway 560. The enterprise resources 504 may be accessed by the mobile device 502 via a transport network 562. The transport network 562 may be a wired network, wireless network, cloud network, local area network, metropolitan area network, wide area network, public network, private network, and the like.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services and the like. Authentication services 558 may use certificates. The certificates may be stored on the mobile device 502, by the enterprise resources 504, and the like. The certificates stored on the mobile device 502 may be stored in an encrypted location on the mobile device, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store may be provided with an intuitive and easy to use User Interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
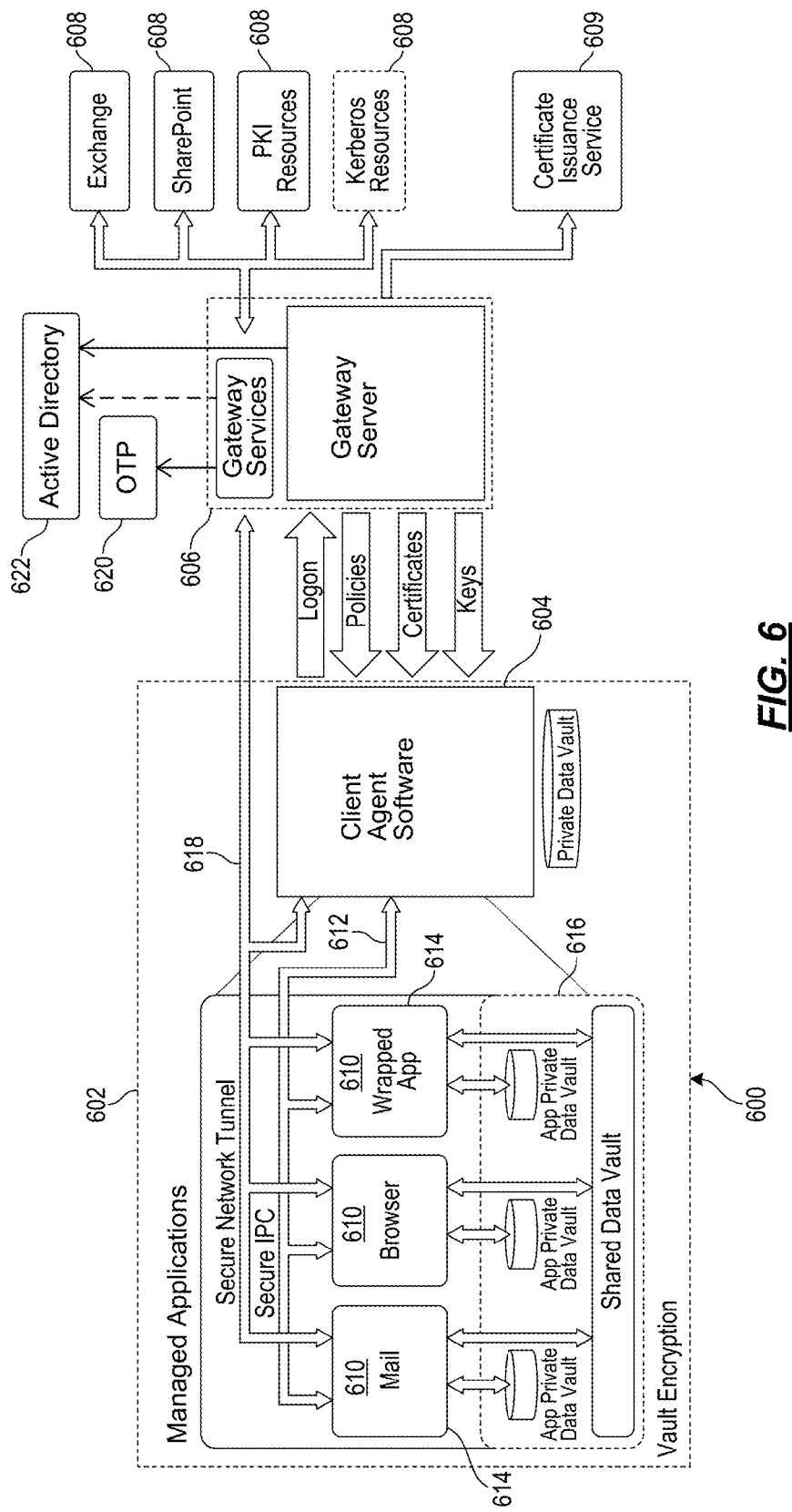
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the device. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) with SSO to other gateway server components. The client agent 604 obtains policies from gateway server 606 to control the behavior of the managed applications 610 on the mobile device 602.

The secure interprocess communication (IPC) links 612 between the native applications 610 and client agent 604 represent a management channel, which allows client agent to supply policies to be enforced by the application management framework 614 "wrapping" each application. The IPC channel 612 also allows client agent 604 to supply credential and authentication information that enables connectivity and SSO to enterprise resources 608. Finally the IPC channel 612 allows the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 requests policy information from client agent 604, which in turn requests it from gateway server 606. The application management framework 614 requests authentication, and client agent 604 logs into the gateway services part of gateway server 606 (also known as NetScaler Access Gateway). Client agent 604 may also call supporting services on gateway server 606, which may produce input material to derive encryption keys for the local data vaults 616, or provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel and obtain the policy for that application. The application management framework 614 may enforce relevant portions of the policy that apply locally, such as the client agent login dependencies and some of the containment policies that restrict how local OS services may be used, or how they may interact with the application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 is responsible for orchestrating the network access on behalf of each application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 606 (including its gateway services) in some cases will not need to validate active directory (AD) passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. When data is stored locally on the device 602 in the secure container 616, it is preferred that a minimum of AES 256 encryption algorithm be utilized.

Other secure container features may also be implemented. For example, a logging feature may be included, wherein all security events happening inside an application 610 are logged and reported to the backend. Data wiping may be supported, such as if the application 610 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, when an application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text is sent to the user with an OTP 620. In some cases, this may be implemented only for online use, with a prompt being a single field.

An offline password may be implemented for offline authentication for those applications 610 for which offline use is permitted via enterprise policy. For example, an enterprise may want StoreFront to be accessed in this manner. In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 610 as secondary credentials (for the purpose of accessing PKI protected web resources via the application management framework micro VPN feature). For example, an application may utilize such a certificate. In this case, certificate-based authentication using ActiveSync protocol may be supported, wherein a certificate from the client agent 604 may be retrieved by gateway server 606 and used in a keychain. Each managed application may have one associated client certificate, identified by a label that is defined in gateway server 606.

Gateway server 606 may interact with an Enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate https requests).

Application management client certificate support on iOS may rely on importing a public-key cryptography standards (PKCS) 12 BLOB (Binary Large Object) into the iOS keychain in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to Active Directory (AD) 622, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 610 is not running.

A multi-site architecture or configuration of enterprise application store and an application controller may be supported that allows users to be service from one of several different locations in case of failure.

In some cases, managed applications 610 may be allowed to access a certificate and private key via an API (example OpenSSL). Trusted managed applications 610 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Location-Based Services

Figure 7:
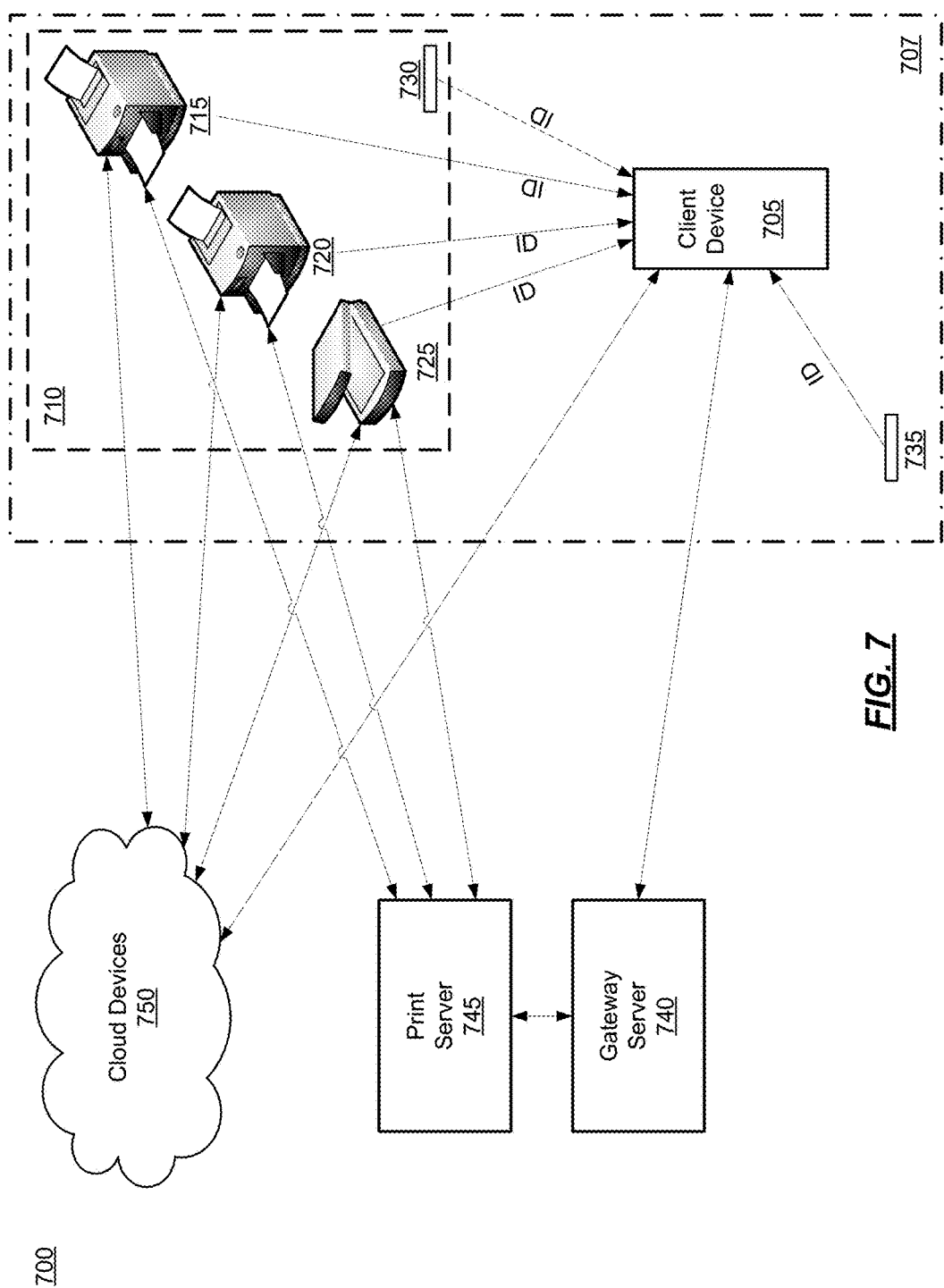
FIG. 7 depicts an illustrative system for making available one or more devices to a client device based on the location of the client device in accordance with one or more illustrative aspects described herein.

FIG. 7 depicts an illustrative system 700 for making available one or more devices 715, 720, and 725 to a client device 705 based on the location of the client device 705 in accordance with one or more illustrative aspects described herein. The system 700 may include one or more client devices, such as device 705. The client device 705 may comprise any of the client devices previously described, such as terminals 240, client computers 411-414, mobile device 502, or mobile device 602.

The system may also include one or more locations 707 and/or 710. For example, the location 707 may comprise a building (e.g., an office building), a floor within the building (e.g., the third floor of the office building), or a region within the floor (e.g., the north half of the third floor of the office building). The location 707 is not limited to a building, a floor, or a region of the floor, and areas comprising the location 707 may be defined in any manner, whether or not the areas are separated by physical barriers, such as doors and walls.

The location 707 may have one or more locations that fall within the boundary of the location 707, such as location 710. For example, the location 710 may comprise a room (e.g., a meeting or conference room, an office, a cubicle, a cafeteria, etc.) or a region within the location 707 that might not be separated by physical barriers, such as a reception desk, an open workspace, a hallway, or a courtyard. The location 710 is not limited to the examples previously listed, and areas comprising the location 710 may be defined in any manner, whether or not the areas are separated by physical barriers.

One or more devices may be located within the location 710. For example, printer 715, printer 720, and scanner 725 may be located within a copy room 710. Each of the printer 715, the printer 720, and the scanner 725 may have a location sensor used to transmit location and/or device information to other devices, such as the client device 705, that come within range of the location sensor. The location sensor may be placed on the device and/or may be integrated within (e.g., inside of) the device. The location sensors may comprise short-range wireless location sensors, such as Bluetooth (including Bluetooth Low Energy (BLE)), Near Field Communication (NFC), or any other short-range wireless sensor. The client device 705 may communicate with the location sensor of each device 715, 720, and 725, as will be described in further detail below. The location 710 may also have its own location sensor 730. For example, the location sensor 730 may be positioned inside the room 710, just outside the room 710, or at the entryway of the room 710 (e.g., the door). The location 707 may also have its own location sensor 735. For example, if the location 707 comprises a floor in a building, the location sensor 735 may be placed somewhere on the floor, such as near an entryway to the floor (e.g., near the elevators, stairway, or other entryway to the floor).

The system 700 may also include a gateway server 740. The gateway server 740 may comprise any of the servers previously described, such as the computing device 201, server 206, virtualization server 301, management server 410, enterprise resources 504, enterprise services 508, access gateway 560, or gateway server 606. The gateway server 740 may communicate with the client device 705 to make available to the client device 705 the services (e.g., printing or scanning services) of devices 715, 720, and/or 725, as will be described in further detail below. The system 700 may optionally include a print server 745. The print server 745 may connect the printer 715, the printer 720, and the scanner 725 to the gateway server 740 and/or the client device 705. The print server 745 may accept printing or scanning jobs from the client device 705 and send the jobs to the appropriate printer or scanner 715, 720, or 725. The print server 745 may be integrated with the gateway server 740 or comprise a server separate from the gateway server 740.

The system 700 may optionally comprise one or more cloud devices 750. The cloud devices 750 may comprise any of the cloud devices previously described, such as the cloud management server 410, cloud computing resources in zone 401, and/or cloud computing resources in zone 402, as illustrated in FIG. 4. In some aspects, the cloud devices 750 may perform one or more of the same functions as the gateway server 740 and/or the print server 745 as described herein (e.g., communicate with the client device 705, communicate with the devices 715, 720, and/or 725, accept and send print or scan jobs, etc.).

Figure 8:
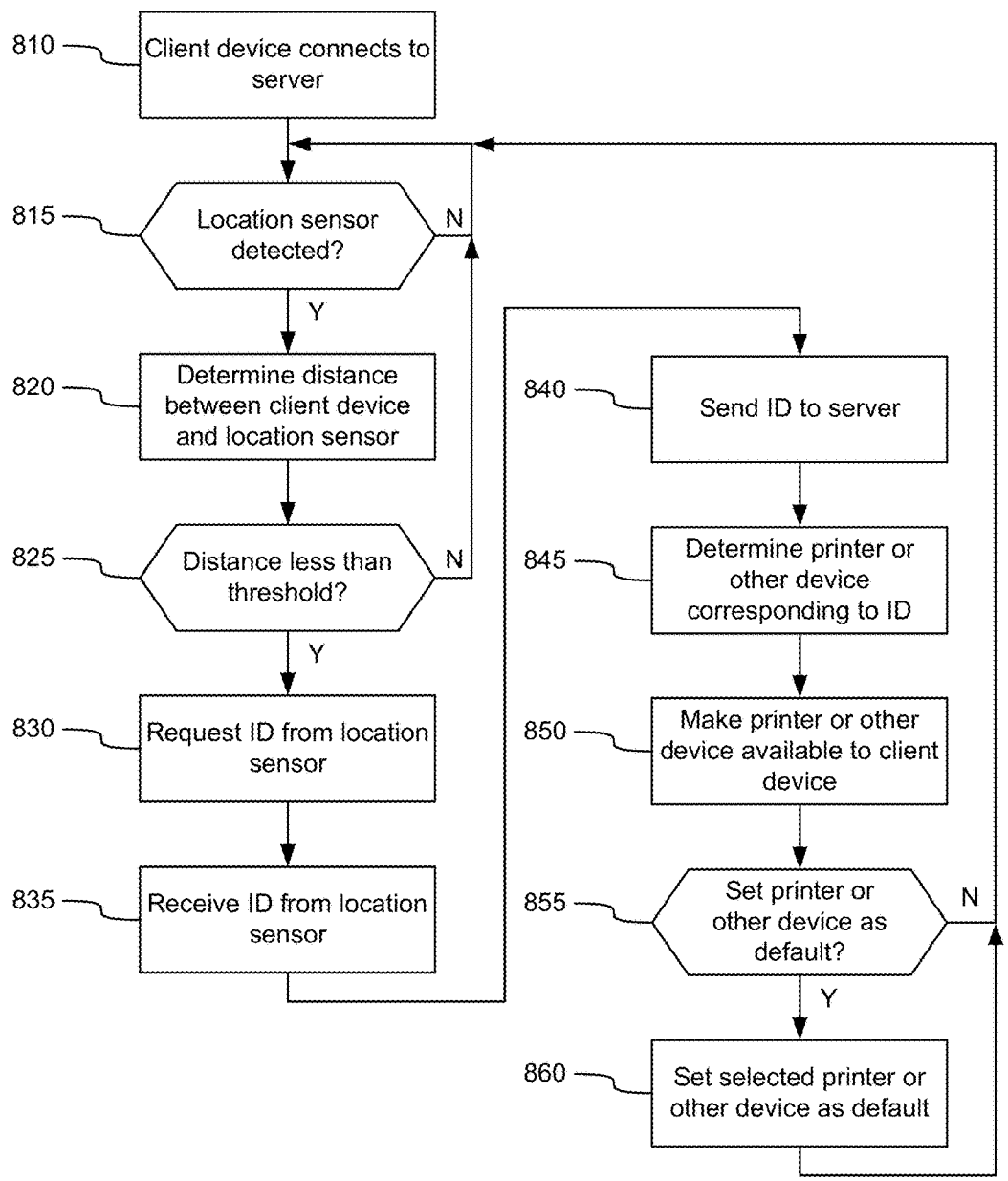
FIG. 8 illustrates an example method of making one or more devices available to a client device based on the location of the client device in accordance with one or more illustrative aspects described herein.

FIG. 8 illustrates an example method of making one or more devices available to the client device 705 based on the location of the client device 705 in accordance with one or more illustrative aspects described herein. In step 810, the client device 705 may connect to the gateway server 740, print server 745, and/or cloud devices 750. For example, the client device 705 may communicate with the gateway server 740 via a secure tunnel. The client device 705 (or a user thereof) may also authenticate with the gateway server 740.

In step 815, the client device 705 may determine whether a location sensor has been detected. The client device 705 (e.g., via a client device application) may listen for signals from, for example, BLE or other short-range wireless beacons. As previously explained, location sensors may be placed on individual printers or other devices, in particular rooms, in particular floors, etc. If the client device 705 does not detect a location sensor (step 815: N), the client device 705 may continue to listen for signals from location sensors. On the other hand, if the client device 705 detects a location sensor (step 815: Y), the client device may proceed to step 820.

In step 820, the client device 705 may determine the distance between the client device 705 and the location sensor detected in step 815. For example, the client device 705 may determine the strength of signals received from the location sensor (e.g., a BLE signal), such as the received signal strength indicator (RSSI). The received signal strength may be used to calculate the distance between the client device 705 and the location sensor. The measured distance may comprise a specific distance (e.g., 5 feet, 2 meters, etc.). Additionally or alternatively, the measured distance may comprise a range of distances, such as close (e.g., 0-5 feet), medium distance (e.g., 5-10 feet), and far (e.g., 10-30 feet).

In step 825, the client device 705 may determine whether the distance between the client device 705 and the detected location sensor is less than a threshold. The threshold may be preconfigured by an administrator. For example, assume the threshold is 20 feet. If the client device 705 is 25 feet away from the location sensor (e.g., step 825: N), the client device 705 may return to step 815 to listen for location sensor signals. If the client device 705 is 17 feet away from the location sensor (e.g., step 825: Y), the client device 705 may proceed to step 830.

In step 830, the client device 705 may optionally request information, such as an identifier, from the location sensor. The identifier may uniquely identify the location sensor and/or the device associated with the location, such as a printer. For example, the identifier may comprise information such as a printer name, printer type, printer IP address, or any other information identifying the printer associated with the location sensor. If the location sensor is associated with a room, a floor, or any other area of space, the identifier may uniquely identify the location sensor and/or the room, floor, or other area of space associated with the location sensor. In some aspects, the client device 705 requesting information from the location sensor may be optional. Instead, the location sensor may send the information without waiting for a request from the client device 705. In step 835, the client device 705 may receive, from the location sensor, the identifier (or other payload information) for the location sensor.

In step 840, the client device 705 may optionally send the location identifier to the gateway server 740, such as via a virtual channel. The client device 705 may send additional information to the gateway server 740, such as print creation data (e.g., data used to create a print job). The gateway server 740 may listen for printer information from the client device 705 and use this information to create managed printers inside the session with the client device 705. As previously explained, the gateway server 740 may coordinate printing services with the print server 745 and/or cloud devices 750.

In step 845, the gateway server 740 may determine the printer or other device corresponding to the identifier of the location sensor. A database may correlate the identifier for each location sensor to one or more device, room, floor, etc. The gateway server 740 may query the database with the location sensor identifier and receive the corresponding device, room, floor, etc. For example, if the location sensor identifier corresponds to printer 715, the database may return to the gateway server 740 an identifier for the printer 715 (e.g., printer name, printer IP address, or other unique identifier for the printer). If the location sensor identifier received from the client device 705 already identifies the printer 715, the gateway server 740 might not query the database.

If the location sensor identifier corresponds to an area (e.g., room, floor, building) that has more than one device, the gateway server 740 may determine the printers or other devices corresponding to the identifier. For example, if the location sensor identifier identifies location sensor 730 (in room 710), the gateway server 740 may determine that the corresponding devices are printer 715, printer 720, and scanner 725. In some aspects, the client device 705 may determine the device(s) corresponding to the identifier(s) rather than the gateway server 740 making the determination. Accordingly, step 840 may be optional, and the client device 705 may perform step 845, as previously described.

In step 850, the gateway server 740 (or the client device 705) may make the corresponding printer or other device available to the client device 705. For example, the gateway server 740 may map the printer or other device to the client device 705. The mapping may be made within the virtual session. In some aspects, drivers for printers or other devices may be pre-installed at the gateway server 740, print server 745, or cloud devices 750. If the drivers are not installed, the gateway server 740 may download and install the drivers corresponding to the printers or other devices determined in step 845. In some aspects, downloading and/or installing printer drivers may be eliminated by using the CITRIX Universal Print Server.

In step 855, the gateway server 740 (or the client device 705) may determine whether to make one of the printers or other devices the default device, and in step 860, the gateway server 740 (or the client device 705) may set the selected printer or other device as the default device if applicable. If the location sensor is associated with a single device (e.g., printer 715), that device may be made the default device. Alternatively, the device set as the default device may be the device closest to the client device 705. With reference to FIG. 7, assume that the client device 705 has already mapped scanner 725 and printer 720. In response to the client device 705 mapping the printer 715, the client device 705 may determine whether printer 715, printer 720, or scanner 725 is the closest to the client device 705. Determining distance was previously described with reference to step 820. If scanner 725 is the closest, the client device 705 may map printer 715, but might not set the printer 715 as the default printer because scanner 725 is still closer to client device 705. The client device 705 may continuously or periodically determine its distance from one or more devices and set devices as default devices accordingly.

If the location sensor is associated with multiple devices (e.g., the location sensor 730 associated with the room 710 having three devices), the client device 705 may set the closest device as the default device as previously explained. If the devices do not have their own location sensors for determining distance to the client device 705, the default device may be preconfigured. For example, the printer 720 may be preconfigured as the default device for the room 710, and the client device 705 may map all three of the devices, but set the printer 720 as the default in step 860.

Figure 10:
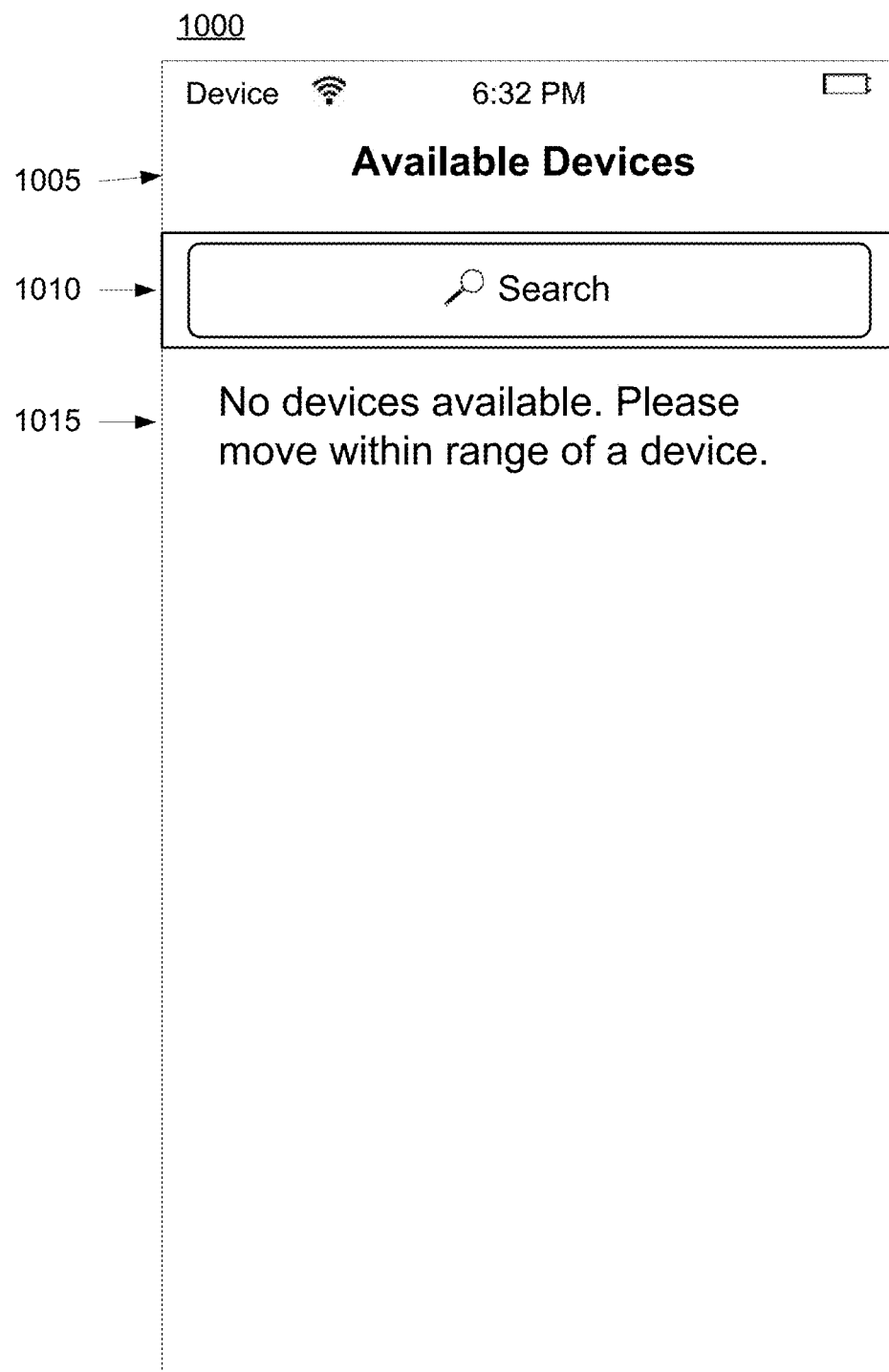
FIG. 10 illustrates an example display screen displaying devices available to the client device in accordance with one or more illustrative aspects described herein.

The client device 705 may display icons, such as printer icons, for devices made available to the client device 705. This may allow a user to select an icon for the printer to use its services, such as printing services. FIG. 10 illustrates an example display screen 1000 displaying devices available to the client device 705 in accordance with one or more illustrative aspects described herein. The client device 705 might not be within range of any devices. The display screen 1000 may include a listing 1005 of available devices (currently none). The display screen 1000 may also display a search bar 1010 that allows the user to search for one or more devices. The display screen 1000 may also display a message 1015 indicating that no devices are available and requesting the user to move within range of a device.

Figure 11:
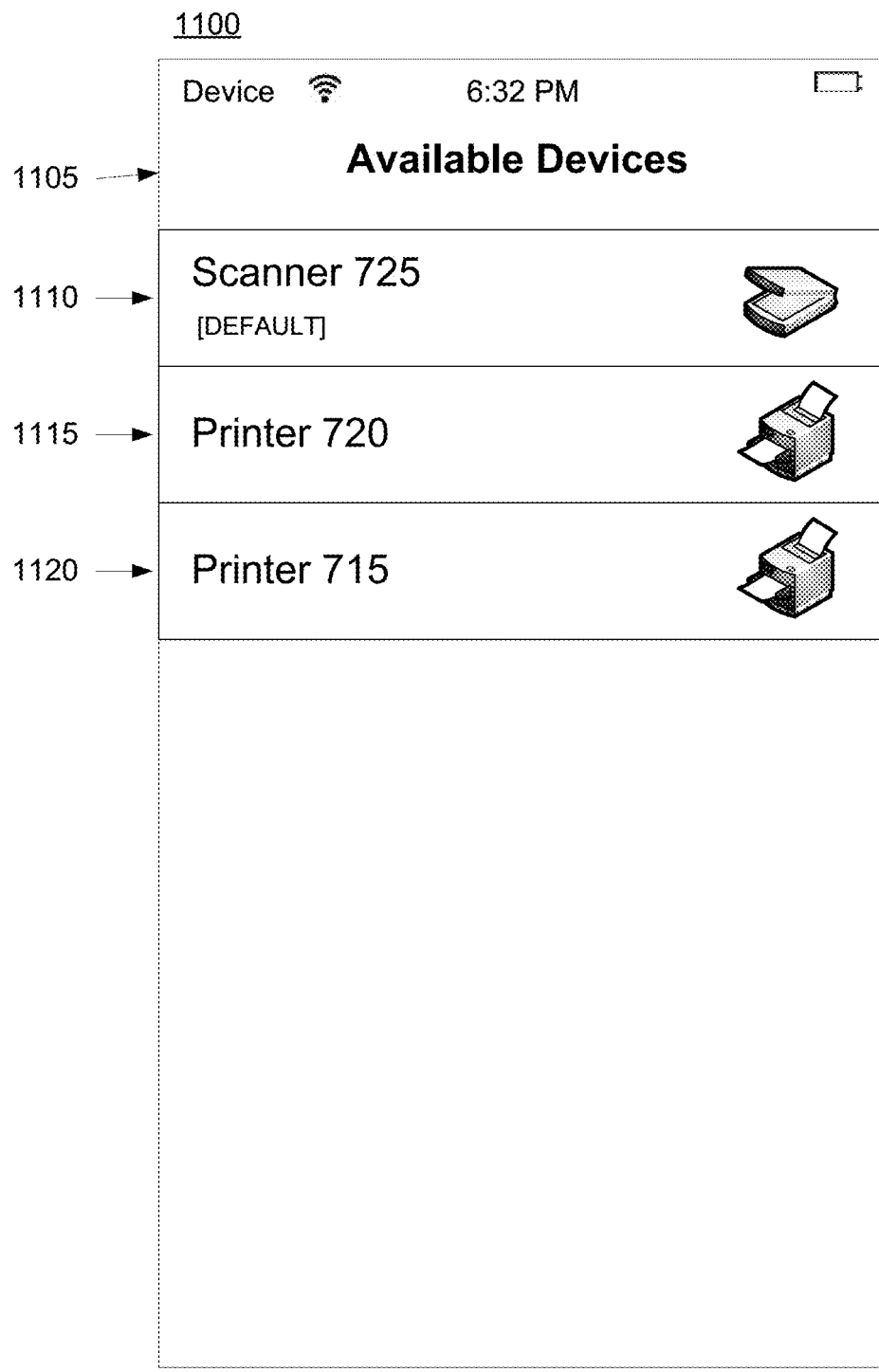
FIG. 11 illustrates another example display screen displaying devices available to the client device in accordance with one or more illustrative aspects described herein.

FIG. 11 illustrates another example display screen 1100 displaying devices available to the client device 705 in accordance with one or more illustrative aspects described herein. For example, the user may have walked into room 710, and the client device 705 may be within range of each of the printer 715, printer 720, and scanner 725. The display screen 1100 may include a listing 1105 of available devices. The display screen 1100 may list each available device in the listing 1105. For example, the listing 1105 may include the scanner 725 (reference 1110), the printer 720 (reference 1115), and the printer 715 (reference 1120). Furthermore, the display screen 1100 may indicate that the scanner 725 has been set as the default device.

Once the client device 705 has been configured for one or more devices, the user of the client device 705 may use resources provided by the one or more devices. For example, the client device 705 may send a print job (with print creation data) to the gateway server 740, print server 745, and/or cloud device 750. The servers and/or cloud devices may forward the print job to the default printer (or the printer selected by the user). Accordingly, the user may use managed printers inside a virtual session without having to manually add printers.

Figure 9:
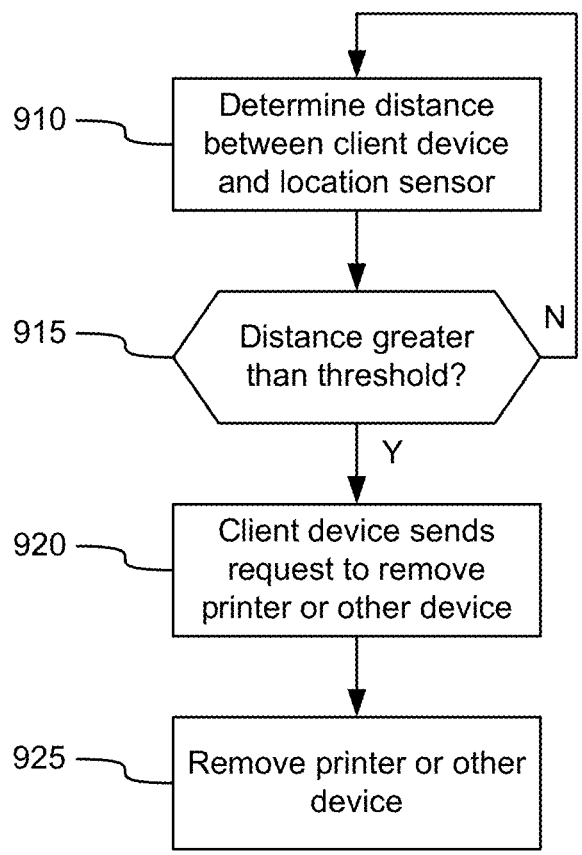
FIG. 9 illustrates an example method of making one or more devices unavailable to the client device based on the location of the client device in accordance with one or more illustrative aspects described herein.

FIG. 9 illustrates an example method of making one or more devices unavailable to the client device 705 based on the location of the client device 705 in accordance with one or more illustrative aspects described herein. In step 910, the client device 705 may determine the distance between it and a location sensor. Determining the distance was previously described with reference to step 820 and will not be repeated here. The client device 705 may continuously or periodically monitor the distance from each location sensor.

In step 915, the client device 705 may determine whether the distance between it and the location sensor is greater than a threshold. The threshold may be the same as the threshold used in step 825 or a different threshold. If the distance is not greater than the threshold (step 915: N), the client device 705 may return to step 910 to monitor the distance. On the other hand, if the distance is greater than the threshold (step 915: Y), the client device 705 may proceed to step 920.

In step 920, the client device 705 may send a request to the gateway device 740 to make the printer or other device corresponding to the location sensor unavailable (or otherwise remove it from a list of printers or other devices). For example. if the user goes out of a beacon threshold or range, the client device 705 may communicate over the virtual channel for the gateway server 740 to remove (e.g., un-map) the device corresponding to the beacon. The client device 705 may also send a request to restore a previous default device (e.g., the immediately preceding default device or a home default device) or new default device (e.g., the next closest device). Rather than sending the request to the gateway device 740, the client device 705 may itself remove the printer or other device and/or restore a previous default device or set a new default device.

In step 925, the gateway device 740 (or the client device 705) may make the printer or other device corresponding to the location sensor unavailable (or otherwise remove it from a list of printers or other devices). For example, the gateway server 740 may delete the corresponding printer or other device and restore the previous default printer or other device.

Rather than using a threshold to determine whether to remove a printer, the client device 705 may request the printer to be removed once the client device 705 is out of range of the location sensor. As previously explained, the client device 705 may also remove the printer itself rather than sending a request to the gateway server 740.

Figure 12:
FIG. 12 illustrates yet another example display screen displaying devices available to the client device in accordance with one or more illustrative aspects described herein.

FIG. 12 illustrates an example display screen 1200 displaying devices available to the client device 705 in accordance with one or more illustrative aspects described herein. In particular, the user of the client device 705 may have moved outside a threshold range of the printer 715 illustrated in FIG. 7. Accordingly, as illustrated in display screen 1200, the printer 715 may be removed from the listing 1205 of available devices. However, the user may still be within range of the scanner 725 and the printer 720. Accordingly, the listing 1205 may include the scanner 725 (reference 1210) and the printer 720 (reference 1215).

In some aspects, devices or locations may be tagged with optical labels, such as a barcode or a Quick Response (QR) code. The user of the client device 705 may capture and image of the optical label using a camera or other optical scanner of the client device 705 (or connected to the client device 705). The optical label may include an identifier for the corresponding device or location (or link to a network location having the identifier). After the identifier is received, the client device 705 may proceed to step 840 and one or more of the subsequent steps illustrated in FIG. 8 to make the corresponding device(s) available to the client device 705.

Virtual Printing

Figure 13:
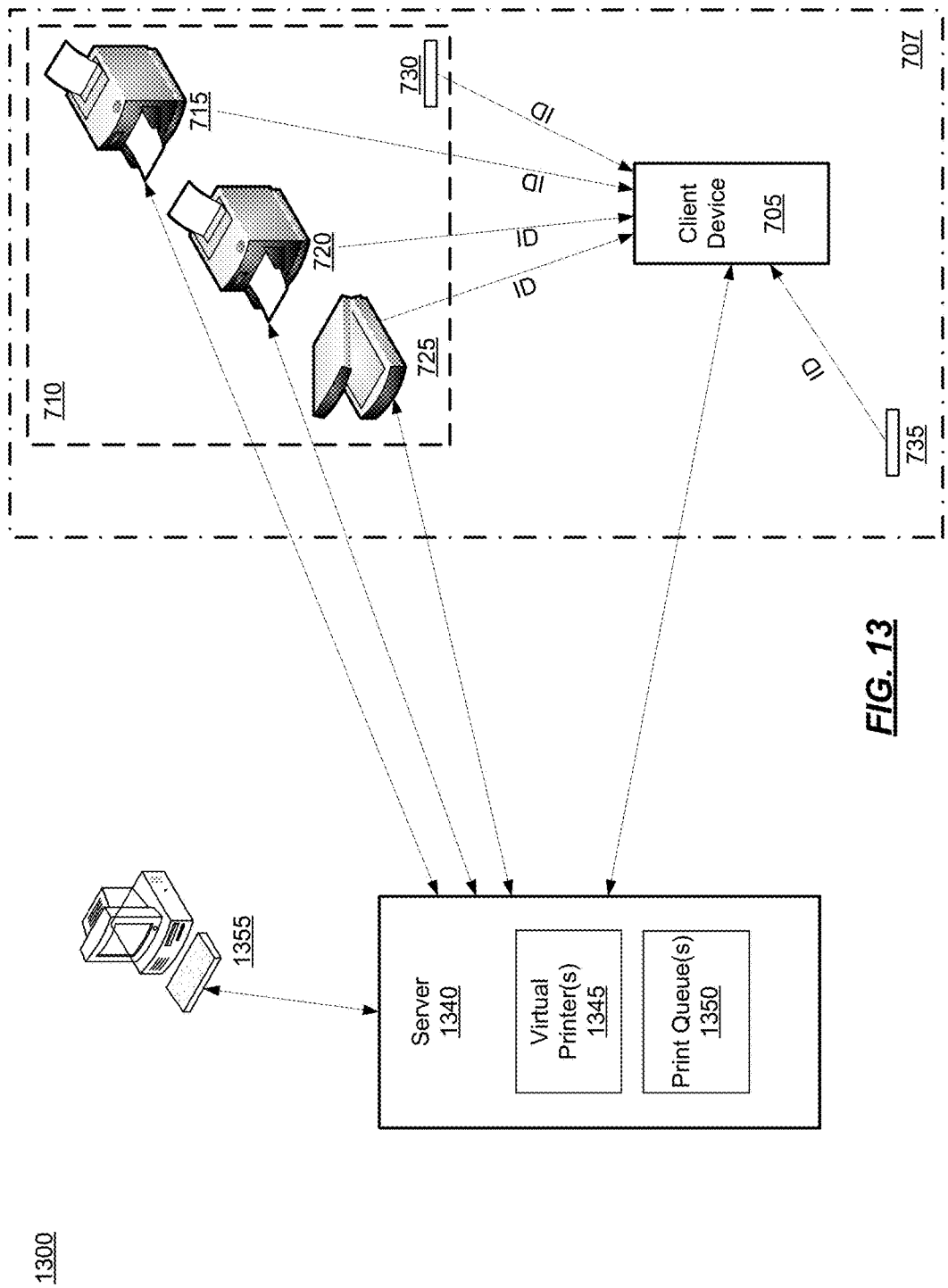
FIG. 13 depicts an illustrative system for virtual printing based on the location of a user device in accordance with one or more illustrative aspects described herein.

FIG. 13 depicts an illustrative system 1300 for virtual printing based on the location of a user (e.g., client) device 705 in accordance with one or more illustrative aspects described herein. As previously described, a system 1300 may include, for example, a client device 705 and locations 707 and/or 710. The system 1300 may also include one or more devices, such as printer 715, printer 720, and scanner 725, and each of the devices may optionally have a location sensor used to transmit location and/or device information to other devices, such as the client device 705, that come within range of the location sensor. The location sensors may comprise short-range wireless location sensors, such as Bluetooth (including Bluetooth Low Energy (BLE)), Near Field Communication (NFC), or any other short-range wireless sensor. Each location 707 and 710 may optionally have its own location sensor, such as location sensor 735 and location sensor 730, respectively. In some aspects, the location sensor may additionally or alternatively comprise an optically scannable code. For example, devices or locations may be tagged with optical labels, such as a barcode or a QR code, as previously described.

The system 1300 may comprise a server 1340. The server 1340 may comprise any of the servers previously described, such as the computing device 201, server 206, virtualization server 301, management server 410, enterprise resources 504, enterprise services 508, access gateway 560, or gateway server 606. The server 1340 may communicate with the client device 705 to receive information identifying a physical printer (e.g., printer 715, printer 720) or another device (e.g., scanner 725), to authenticate the user of the client device 705, and/or to send a print job to a physical printer, as will be described in further detail below. The server 1340 may include one or more virtual printers 1345 that accepts printing or scanning jobs from the client device 705 or another user device 1355, such as a desktop computer, a laptop computer, or any other user device. The server 1340 may also include one or more virtual print queues 1350 that store virtual print jobs received from various users, and each user may have his or her own virtual printer 1345 and/or virtual print queue 1350. In other words, a user may print to a virtual printer 1345 from any of the user's devices, and the server 1340 may send a corresponding print job stored in the print queue 1350 to the appropriate physical printer 715 or 720 (or scanner 725 for a scan job), as will be described in detail below.

Figure 14:
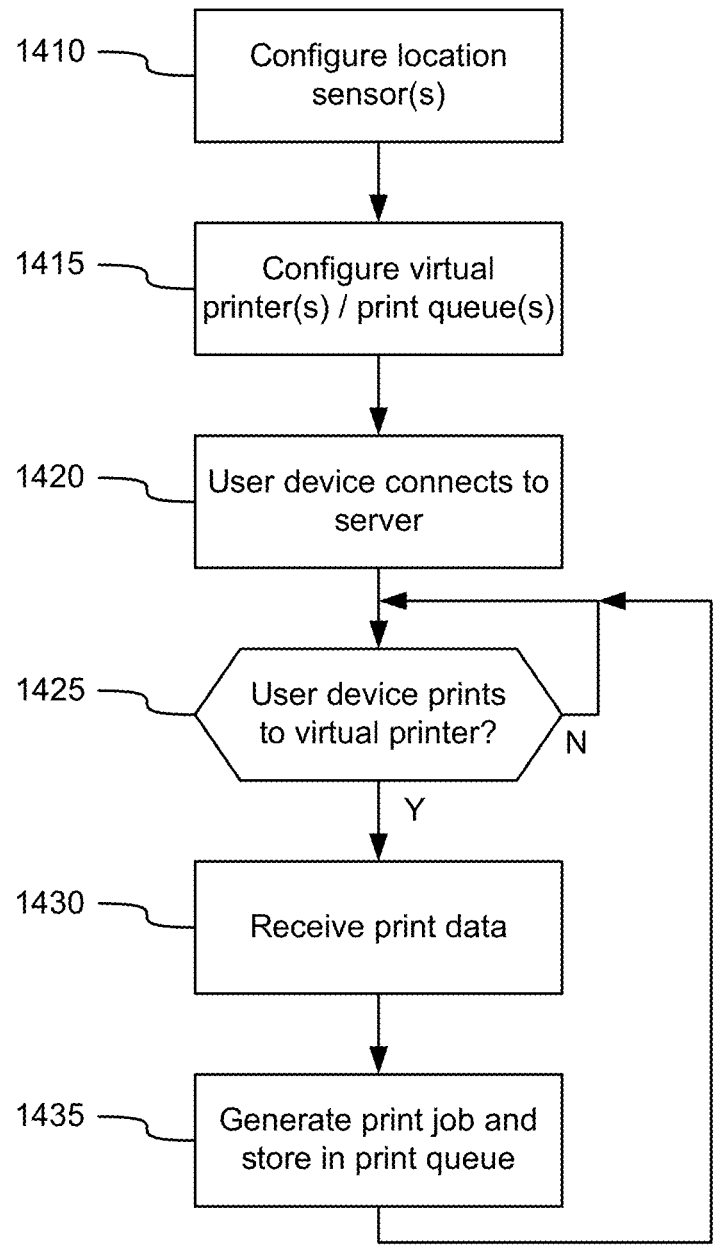
FIG. 14 illustrates an example method of printing to a virtual printer and storing a print job in a print queue in accordance with one or more illustrative aspects described herein.

FIG. 14 illustrates an example method of printing to a virtual printer 1345 and storing a print job in a print queue 1350 in accordance with one or more illustrative aspects described herein. In step 1410, location sensors may be configured. For example, each location sensor (e.g., a short-range wireless beacon or a QR code) may be correlated to or otherwise associated with one or more devices 715, 720, and 725. As previously described, a database may correlate an identifier for each location sensor to one or more device, room, floor, etc. The server 1340 may query the database with a location sensor identifier received from the client device 705 and determine the device, room, floor, etc. corresponding to the identifier.

In step 1415, virtual printer(s) 1345 and/or print queue(s) 1350 may be configured for user(s). An administrator may provision virtual printers and print queues for the users. Each user may be assigned to or otherwise associated with a unique virtual printer 1345 and/or a unique print queue 1350. The virtual printer 1345 may comprise a software application that the operating system of the user device 1355 and/or client device 705 sees as a printer and can print to. For example, the virtual printer 1345 may comprise a server component and a client device component. The client device component may be installed on the user device 1355, client device 705, or any other user device, whereas the server component may be installed on the server 1340. A user may print to the client device component of the virtual printer 1345 on the user's device, and the client device component may communicate with the server component of the virtual printer 1345 to send print creation data to the server 1340 and store the data in the print queue 1350.

In step 1420, a user device, such as the computing device 1355 or the client device 705, may be connected to the server 1340. Step 1420 may be similar to step 810 described above, and the client device 705 may communicate with the server 1340 via, for example, a secure tunnel.

In step 1425, the server 1340 may determine whether the user device has printed to the user's virtual printer 1345. For example, the user may select a print option in word processing software, photograph editing or viewing software, document viewing software, or any other software with printing capabilities. The user may choose to print the item (e.g., a document or 3D part) to the user's virtual printer 1345 and select the virtual printer 1345 from, for example, a pull-down menu if multiple printers are available to the user. If the user device printed an item to the virtual printer 1345 (step 1425: Y), the method may proceed to step 1430. Otherwise (step 1425: N), the method may return to step 1425 to determine whether an item has been printed to the virtual printer 1345.

In step 1430, the server 1340 may receive print data from the user device. For example, the server 1340 may receive print creation data (e.g., data used to create a print job) from a user device, such as the client device 705 or the user device 1355.

In step 1435, the server 1340 may generate a print job based on the print creation data. The server may also store the print job in the user's print queue 1350. As previously explained, each user may have his or her own print queue 1350 associated with an identifier of the user, such as a name, username, unique ID, etc. In some aspects, the CITRIX Universal Print Server may be used to generate the print job and/or to store the print job in the queue 1350. The method may return to step 1425 to determine whether more items have been printed to the user's virtual printer 1345.

Figure 15:
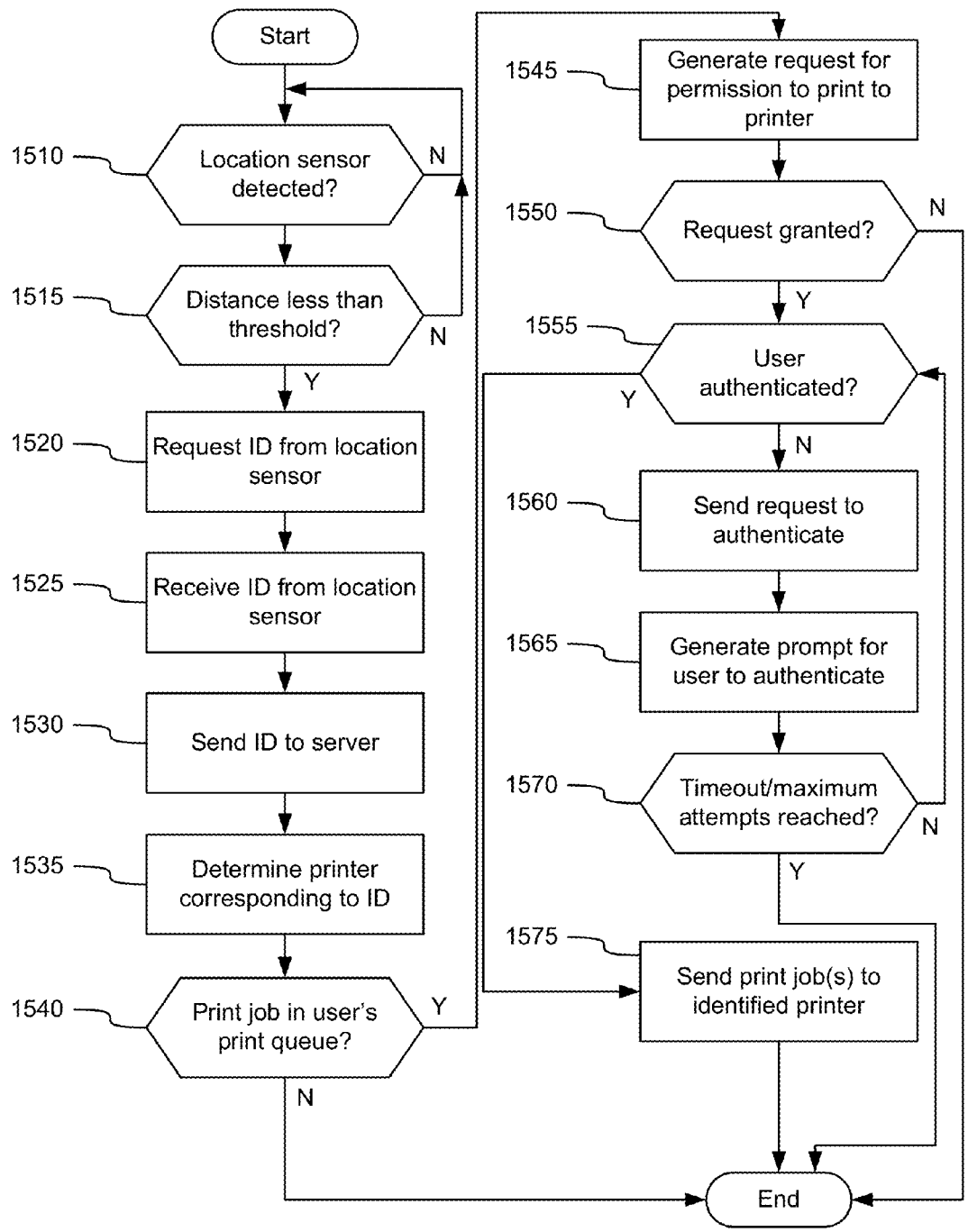
FIG. 15 illustrates an example method of a virtual printer sending a print job to a physical printer based on the location of a user device in accordance with one or more illustrative aspects described herein.

FIG. 15 illustrates an example method of a virtual printer sending a print job to a physical printer based on the location of a user device in accordance with one or more illustrative aspects described herein. In step 1510, the client device 705 may determine whether a location sensor has been detected. Step 1510 may be similar to step 815 previously described. The user of the client device 705 may walk within range of a printer and/or location sensor, and monitor for a signal from a short-range wireless transmitter (e.g., a Bluetooth beacon) or determine that a QR or other optical code has been scanned by the client device 705. If the client device 705 does not detect a location sensor (step 1510: N), the client device 705 may continue to listen for signals from location sensors. On the other hand, if the client device 705 detects a location sensor (step 1510: Y), the client device may proceed to step 1515.

In step 1515, the client device 705 may determine the distance between the client device 705 and the location sensor detected in step 1510. The client device 705 may also determine whether the distance between the client device 705 and the detected location sensor is less than a threshold. Step 1515 may be similar to steps 820 and/or 825 previously described. If the distance between the client device 705 and the location sensor is not less than the threshold (step 1515: N), the client device 705 may return to step 1510 to listen for location sensor signals. If the distance between the client device 705 and the location sensor is less than the threshold (e.g., step 1515: Y), the client device 705 may proceed to step 1520. Step 1515 might not be performed if an optical label, such as a QR code, is used as the location sensor.

In step 1520, the client device 705 may optionally request information, such as an identifier, from the location sensor. Step 1520 may be similar to step 830 previously described. In some aspects, the client device 705 requesting information from the location sensor may be optional. Instead, the location sensor may send the information without waiting for a request from the client device 705. In step 1525, the client device 705 may receive, from the location sensor, the identifier (or other payload information) for the location sensor.

In step 1530, the client device 705 may optionally send the location identifier to the server 1340, e.g., via a virtual channel. The client device 705 may send additional information to the server 1340, such as print creation data (e.g., data used to create a print job). Step 1530 may be similar to step 840 previously described.

In step 1535, the server 1340 may determine the printer or other device corresponding to the identifier of the location sensor. Step 1535 may be similar to step 845 previously described. For example, a database may correlate the identifier for each location sensor to one or more device, room, floor, etc., and the server 1340 may query the database with the location sensor identifier to determine the corresponding device, room, floor, etc. Alternatively, if the location sensor identifier received from the client device 705 already identifies the printer 715, the server 1340 might not query the database.

In step 1540, the server 1340 may determine whether the user has one or more print job in the user's print queue 1350. As previously explained, each time the user prints to the virtual printer 1345, the server 1340 may store a corresponding print job (with print creation data) in the print queue 1350. If the user does not have any print jobs in the print queue (step 1540: N), the process may end, the server 1340 may continue to monitor for new print jobs in the user's print queue, and/or the server 1340 may continue to monitor for new location sensor IDs. If the user does have one or more print job (step 1540: Y), the server may proceed to step 1545.

In step 1545, the server 1340 and/or the client device 705 may generate a request for permission to print the print job to the identified printer. For example, the client device 705 may request the user's permission to route one or more of the user's print jobs to the printer identified by the server 1340. The client device 705 may vibrate, display a notification, display a prompt, or otherwise display a request for the user to approve a print job.

Figure 16:
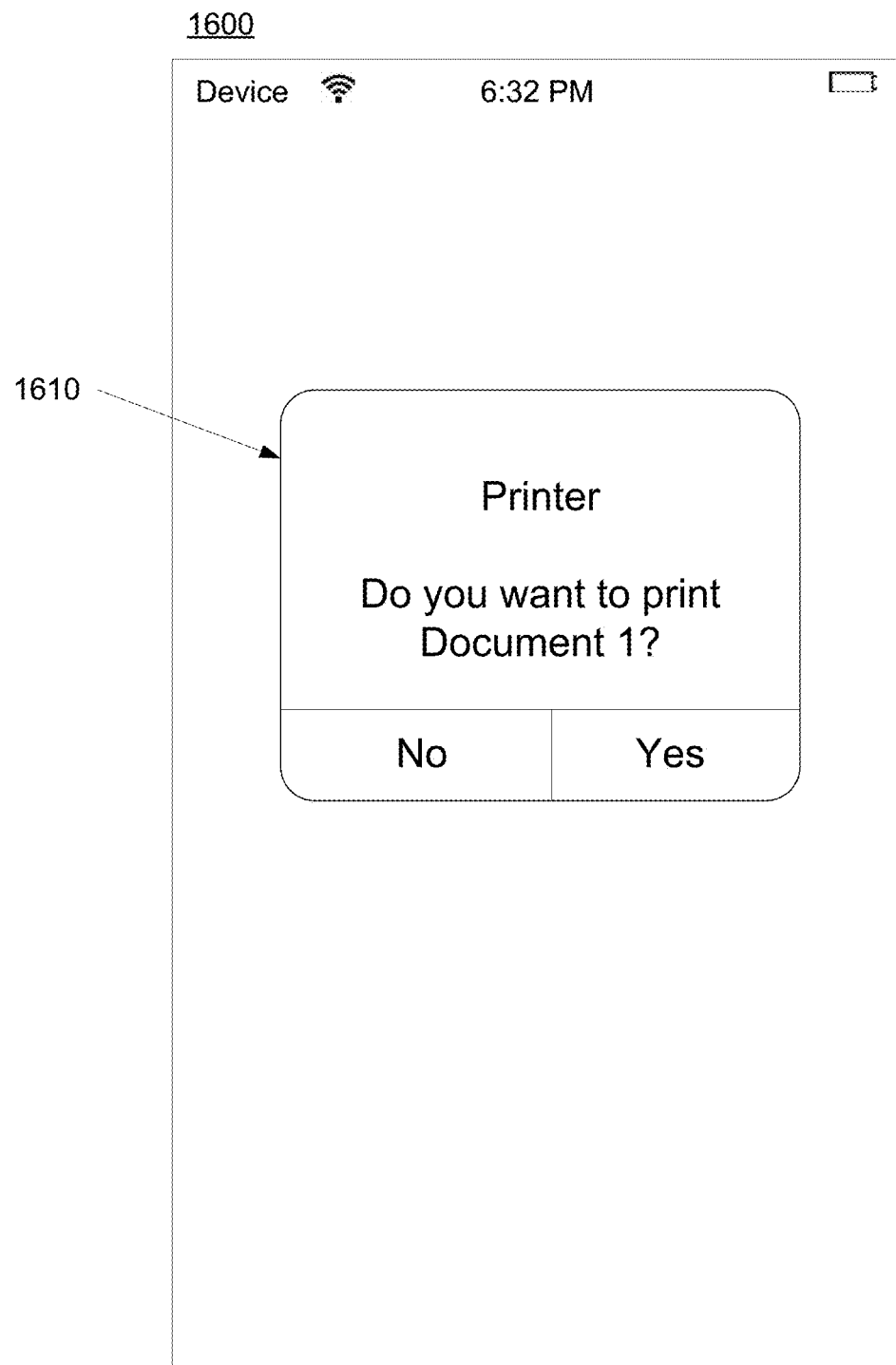
FIG. 16 illustrates an example display screen displaying a request for permission to print to a printer in accordance with one or more illustrative aspects described herein.

FIG. 16 illustrates an example display screen 1600 displaying a request 1610 for permission to print to a printer in accordance with one or more illustrative aspects described herein. For example, the request 1610 may identify the print job and state, for example, "Do you want to print Document 1?" The request 1610 may optionally identify the physical printer. The request 1610 may include an option for the user to grant the request ("Yes") and an option for the user to deny the request ("No"). In some aspects, multiple physical printers may be available, such as if multiple printers are at the same location or within range of the client device 705. The user may be able to select a printer for the server 1340 to send the print job to.

Figure 17:
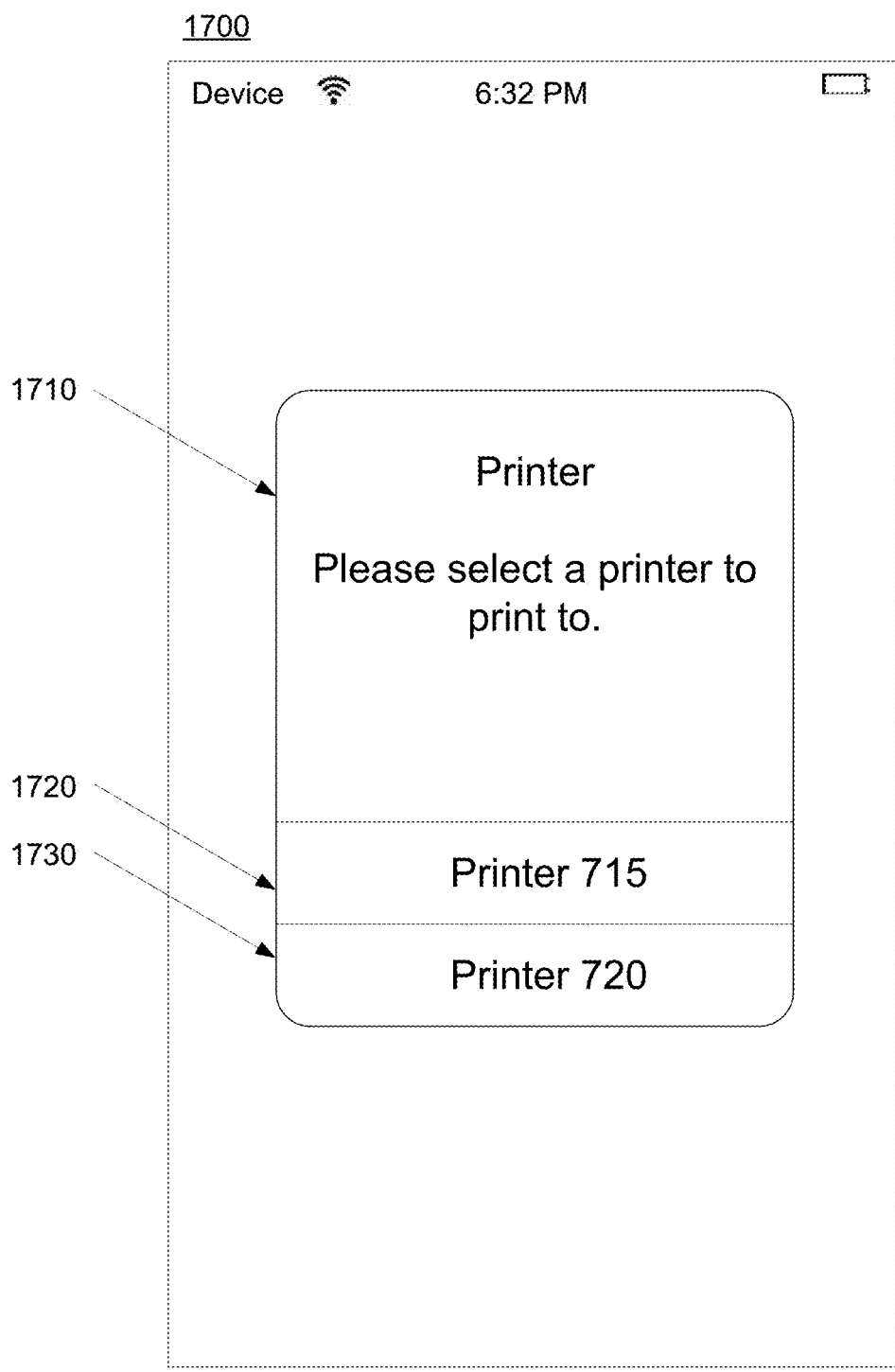
FIG. 17 illustrates an example display screen displaying a request to select a printer to print to in accordance with one or more illustrative aspects described herein.

FIG. 17 illustrates an example display screen 1700 displaying a request 1710 to select a printer to print to in accordance with one or more illustrative aspects described herein. The request 1710 may state, for example, "Please select a printer to print to." The request 1710 may also display selectable options for the available printers, such as the printer 715 and the printer 720.

Returning to FIG. 15, in step 1550, the server 1340 and/or the client device 705 may determine whether the print request was granted and/or a printer was selected (if multiple printers are available). For example, the server 1340 and/or the client device 705 may determine whether the user selected the "Yes" option illustrated in FIG. 16 or one of the printers listed in FIG. 17. If the print request was not granted (step 1550: N), the process may end, the server 1340 may continue to monitor for new print jobs in the user's print queue, and/or the server 1340 may continue to monitor for new location sensor IDs. If the print request was granted (step 1550: Y), the server may proceed to step 1555.

In step 1555, the server 1340 and/or the client device 705 may determine whether the user is authenticated, such as to a virtual desktop. Various methods of authentication were previously described in detail. If the user is authenticated (step 1555: Y), the server 1340 and/or the client device 705 may proceed to step 1575, as will be described in detail below. If the user is not authenticated (step 1555: N), the server may proceed to step 1560.

In step 1560, the server 1340 may generate and send a request to the client device 705 for the user to authenticate via the client device 705. In step 1565, the client device 705 may receive the request from the server 1340 and generate and/or display a prompt for the user to authenticate. For example, the user may be prompted to provide credentials, such as a username/password, a fingerprint, a retinal scan, facial recognition, or any other credentials. The type of credential requested may depend on the capabilities of the device 705 (e.g., a fingerprint if the client device has a fingerprint reader, facial recognition if the client device has a front-facing camera, etc.).

In step 1570, the server 1340 and/or the client device 705 may determine whether a timeout occurred and/or the maximum number of authentication attempts by the user has been reached (e.g., 3 times or 6 times). If so (step 1570: Y), the process may end, the server 1340 may continue to monitor for new print jobs in the user's print queue, and/or the server 1340 may continue to monitor for new location sensor IDs. If not (step 1570: N), the server may return to step 1555 to determine whether to authenticate the user using the credentials provided by the user.

If the user is authenticated (step 1555: Y), in step 1575, the server 1340 may send one or more of the user's print jobs stored in the print queue 1350 to the identified printer, such as printer 715 or printer 720. For example, the server 1340 may spool the print job and send the print creation data corresponding to the print job to the identified printer.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:

receiving, at a server, print creation data associated with a user;

responsive to receiving the print creation data, generating, by the server, a print job and storing, by the server, the print job in a virtual print queue corresponding to the user;

responsive to the server receiving an identifier from a user device associated with the user, determining, by the server, a printer corresponding to the received identifier, wherein the user device is configured to determine the identifier from a location sensor when the user device is within range of the location sensor, wherein the location sensor is associated with a location of the printer, wherein the user device is configured to determine a signal strength of a signal received by the user device and from the location sensor and determine a distance between the location sensor and the user device based on the signal strength of the signal received by the user device and from the location sensor, and wherein the user device is configured to send the identifier responsive to a determination that the distance between the location sensor and the user device is less than a threshold; and sending, by the server and based on the determination that the distance between the location sensor and the user device is less than the threshold, the print job stored in the virtual print queue to the determined printer.

2. The method of claim 1, further comprising:

generating a request for permission to send the print job to the determined printer, wherein the request is displayable on the user device; and receiving, from the user device, permission to send the print job to the determined printer, wherein sending the print job is performed responsive to receiving the permission to send the print job to the determined printer.

3. The method of claim 1, wherein the printer comprises a plurality of printers at a same location, the method further comprising:

generating a request for a selection of one of the plurality of printers, wherein the request is displayable on the user device; and receiving, from the user device, a selection of one of the plurality of printers, wherein sending the print job is performed responsive to receiving the selection of the one of the plurality of printers.

4. The method of claim 1, further comprising:

generating a request to authenticate the user, wherein the request is displayable on the user device; and authenticating the user based on user credentials received from the user device, wherein sending the print job is performed responsive to authenticating the user based on the user credentials.

5. The method of claim 1, wherein the location sensor comprises a short-range wireless sensor.

6. The method of claim 1, wherein receiving the print creation data comprises receiving the print creation data from a second user device associated with the user.

7. The method of claim 1, further comprising:

after determining the printer corresponding to the received identifier, sending, by the server and to the user device, a request for the user to authenticate via the user device;

receiving, by the server and from the user device, user credentials; and authenticating the user based on the received user credentials, wherein sending the print job stored in the virtual print queue to the determined printer is performed in response to authenticating the user based on the received user credentials.

8. A method comprising:

sending, to a server, print creation data for an item, wherein the server is configured to generate a print job for the item to be printed and store the print job in a print queue corresponding to a user;

detecting, by a user device associated with the user, a location sensor, wherein the location sensor is associated with a location of a printer;

after detecting the location sensor, receiving, by the user device and from the location sensor at the location of the printer, a signal;

determining a signal strength of the signal received by the user device and from the location sensor;

determining, based on the signal strength of the signal received by the user device and from the location sensor, a distance between the location sensor and the user device;

responsive to detecting the location sensor and determining that the distance between the location sensor and the user device is less than a threshold, determining, by the user device, an identifier from the location sensor; and sending, by the user device and to the server, the identifier, wherein the server is configured to send the print job to a printer corresponding to the identifier.

9. The method of claim 8, further comprising:

generating for display on a display of the user device a request for permission to send the print job to the printer; and sending, to the server, permission to send the print job to the printer, wherein the server is configured to send the print job to the printer responsive to sending the permission to the server.

10. The method of claim 8, wherein the printer comprises a plurality of printers at a same location, the method further comprising:

generating for display on a display of the user device a request for a selection of one of the plurality of printers; and sending, to the server, the selection of one of the plurality of printers, wherein the server is configured to send the print job to the printer responsive to sending the selection.

11. The method of claim 8, further comprising:

generating for display on a display of the user device a request to authenticate the user; and sending, to the server, user credentials, wherein the server is configured to send the print job to the printer responsive to authenticating the user based on the user credentials.

12. The method of claim 8, wherein the location sensor comprises a short-range wireless sensor.

13. The method of claim 8, wherein:

the user device comprises a mobile device, and sending the print creation data for the item is performed by a second user device.

14. The method of claim 8, wherein the location sensor comprises a bluetooth location sensor, and wherein the signal received by the user device comprises a bluetooth signal.

15. The method of claim 8, wherein determining the distance between the location sensor and the user device comprises determining a first range of distances, of a plurality of ranges of distances, between the location sensor and the user device.

16. The method of claim 8, wherein the location sensor is associated with a plurality of printers at the location, and wherein the plurality of printers includes the printer, the method further comprising:
   sending, by the user device and to the server, a selection of the printer, of the plurality of printers at the location, wherein the server is configured to send the print job to the printer responsive to sending the selection.

17. A non-transitory computer-readable medium storing instructions that, when read by a computing device, cause the computing device to:
   receive print creation data associated with a user;
   responsive to receiving the print creation data, generate a print job and store the print job in a virtual print queue corresponding to the user;
   responsive to receiving an identifier from a user device associated with the user, determine a printer corresponding to the received identifier, wherein the user device is configured to determine the identifier from a location sensor when the user device is within range of the location sensor, wherein the location sensor is associated with a location of the printer, wherein the user device is configured to determine a signal strength of a signal received by the user device and from the location sensor and determine a distance between the location sensor and the user device based on the signal strength of the signal received by the user device and from the location sensor, and wherein the user device is configured to send the identifier responsive to a determination that the distance between the location sensor and the user device is less than a threshold; and
   send, based on the determination that the distance between the location sensor and the user device is less than the threshold, the print job stored in the virtual print queue to the determined printer.

18. The non-transitory computer-readable medium of claim 17 storing instructions that, when read by the computing device, cause the computing device to:
   generate a request for permission to send the print job to the determined printer, wherein the request is displayable on the user device; and
   receive, from the user device, permission to send the print job to the determined printer,
   wherein sending the print job is performed responsive to receiving the permission to send the print job to the determined printer.

19. The non-transitory computer-readable medium of claim 17, wherein the printer comprises a plurality of printers at a same location, the non-transitory computer-readable medium storing instructions that, when read by the computing device, cause the computing device to:
   generate a request for a selection of one of the plurality of printers, wherein the request is displayable on the user device; and
   receive, from the user device, a selection of one of the plurality of printers,
   wherein sending the print job is performed responsive to receiving the selection of the one of the plurality of printers.

20. The non-transitory computer-readable medium of claim 17 storing instructions that, when read by the computing device, cause the computing device to:
   generate a request to authenticate the user, wherein the request is displayable on the user device; and
   authenticate the user based on user credentials received from the user device,
   wherein sending the print job is performed responsive to authenticating the user based on the user credentials.

* * * * *